US006722907B2

(12) United States Patent
Bauer et al.

(10) Patent No.: US 6,722,907 B2
(45) Date of Patent: Apr. 20, 2004

(54) DEVICE FOR CONNECTING COMPONENTS WITH VARIOUS ELECTRICAL POTENTIALS AND SUBJECT TO VIBRATION

(75) Inventors: Peter-Josef Bauer, Tienen (BE); Thomas Lott, Buehl (DE); Rainer Becker, Beinheim (DE); Michael Speth, Bartholomae (DE); Christian Meyer, Karlsruhe Groetzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/239,108

(22) PCT Filed: Jan. 20, 2001

(86) PCT No.: PCT/DE01/00246

§ 371 (c)(1),
(2), (4) Date: Sep. 19, 2002

(87) PCT Pub. No.: WO01/71889

PCT Pub. Date: Sep. 27, 2001

(65) Prior Publication Data

US 2003/0032323 A1 Feb. 13, 2003

(30) Foreign Application Priority Data

Mar. 22, 2000 (DE) ........................................ 100 14 227

(51) Int. Cl.[7] ............................................ H01R 13/627
(52) U.S. Cl. ........................ 439/271; 439/350; 439/509
(58) Field of Search ................................ 439/271, 509, 439/92, 860, 277, 283, 382, 350; 310/380

(56) References Cited

U.S. PATENT DOCUMENTS 4,648,579 A * 3/1987 Wilson ........................ 310/51
4,655,099 A * 4/1987 Hansen ....................... 248/606
5,063,317 A * 11/1991 Bruhn ......................... 310/91
6,373,212 B1 * 4/2002 Bender ....................... 318/443
6,379,169 B1 * 4/2002 Corona ....................... 439/271
6,462,455 B2 * 10/2002 Hatley et al. ............... 310/214

FOREIGN PATENT DOCUMENTS

| | | |
|---|---|---|
| DE | 43 37 390 A | 4/1995 |
| DE | 197 01 739 A1 | 7/1998 |
| DE | 198 32 015 A | 2/1999 |
| DE | 198 51 455 A | 8/1999 |
| EP | 0 538 495 A | 4/1993 |
| EP | 0 971 474 A | 1/2000 |
| GB | 2 284 246 A | 5/1995 |

* cited by examiner

*Primary Examiner*—Dean Reichard
*Assistant Examiner*—Angel R. Estrada
(74) *Attorney, Agent, or Firm*—Michael J. Striker

(57) ABSTRACT

The invention concerns a device for connecting vibrating components having different electric potentials, in particular for connecting a stator housing (8) for an electric motor (1) with a housing (4) for control electronics (6) inside a clutch actuator of a motor vehicle, containing electrical contact means (30) for establishing an electrically conductive connection between the components, and means (26) for establishing its mechanical connection.

The invention provides that the means for establishing the mechanical connection have at least one plastic ring (26) held in an opening (16) of a first component (2, 4, 6) and a neck-shaped attachment segment (14) formed in a second component (1, 8), whereby, by pushing the neck-shaped attachment segment (14) of the second component (1, 8) into the opening (16) of the first component (2, 4, 6), the plastic ring (26) can be compressed in the radial direction, forming a non-positive connection between the two components, and, simultaneously, the electrical contact means (30) can be engaged with each other.

10 Claims, 2 Drawing Sheets

DEVICE FOR CONNECTING COMPONENTS WITH VARIOUS ELECTRICAL POTENTIALS AND SUBJECT TO VIBRATION

BACKGROUND OF THE INVENTION

The invention is based on a device for connecting vibrating components that have different electrical potentials, in particular for connecting a stator housing for an electric motor with a housing for control electronics inside a clutch actuator of a motor vehicle.

A clutch actuator for engaging and disengaging a motor vehicle clutch is made known in DE 197 01 739 A1, which said clutch actuator has an elongated electric motor that is controlled by control electronics. The electric motor and the control electronics are subjected to vehicle vibrations, whereby particularly strong vibrations are induced when the clutch actuator is mounted directly on the gearbox. As a result, a mechanical connection between such components must be fatigue-resistant in design. Moreover, the electric motor and the control electronics are current-carrying radio-interference sources that produce electromagnetic fields and influence each other as well as other electrical components of the motor vehicle. For example, the stator housing of the electric motor has a different electrical potential than the housing in which the control electronics are contained, so that the difference in potential causes an electromagnetic field to be radiated. For this reason, such components must be designed so that they are electromagnetically compatible with each other and with other components.

SUMMARY OF THE INVENTION

Since the transfer of force between the two components takes place essentially only by means of the plastic ring, the device according to the invention has the advantage that, by pressing the plastic ring between the attachment segment and the opening, a connection having sufficient static stiffness can be produced, on the one hand and, on the other, dimensional equalization can occur as a result of the remaining residual elasticity of the plastic material, by way of which a fatigue-resistant connection is ensured.

Moreover, due to the relatively high dynamic resilience of plastic, the two components are largely decoupled from each other in terms of vibrations, i.e., transfers of structure-borne noises between the components are prevented. In general, the damping of a machine design consisting of individual components results primarily from the damping occurring at the interconnect points of individual components. It is commonly known that plastic material has good damping properties; this is why resonance resiliences produced by externally-caused vibrations can be reduced by means of the plastic ring.

The electrical contact means bridge the gap between the radially outer circumferential surface of the attachment segment and the radially inward circumferential surface of the opening in which the plastic ring is pressed, and therefore act to equalize potentials between the components and, as a result, provide electromagnetic compatibility between said components and between themselves and other components.

Finally, the combination, according to the invention, of the plastic ring—that establishes the mechanical connection and transfers force—with the electrical contact means can be realized in a single assembly step, i.e., by inserting the attachment segment of the one component into the opening of the other component, while simultaneously establishing a mechanical and electrical connection.

A particularly preferred further development of the invention provides that the first component contains a mounting plate composed of an electrically conductive material, e.g., aluminum die casting, and a housing—that is mounted to one end of said mounting plate and is also electrically conductive—for the control electronics of a clutch actuator for engaging and disengaging a motor vehicle clutch and, on the other end of the mounting plate, the opening is formed in a collar. The second component contains an electric motor of the clutch actuator that has a stator housing composed of electrically conductive material. The housing that contains the control electronics and the stator housing are advantageously located close together and parallel to each other on the same side of the mounting plate. As a result of the equidirectional arrangement, the elongated electric motor and the control electronics form a particularly compact unit that can be located in the clutch actuator housing in space-saving fashion.

According to a further development, the electrical contact means contain a ring formed on a radially inner circumferential surface of the opening of the mounting plate, which said ring has peripherally-separated blades located around at least part of the circumference of the opening and extending radially inwardly, each of which said blades is outfitted with a thin pinching rib on its exposed end, which said pinching rib can be brought to bear against the outer circumferential surface of the attachment segment while the attachment segment is inserted in the opening and, as a result, it can be compressed by a small amount in the radial direction. Due to the resultant elastic and/or plastic deformation of the pinching ribs, a reliable, electrically conductive contact is established, so that a low-ohmic connection is produced.

BRIEF DESCRIPTION OF THE DRAWINGS

An exemplary embodiment of the invention is presented in the drawings and described in greater detail in the subsequent description.

DESCRIPTION OF THE PREFERRED EMBODIMENTS

Figure 1:
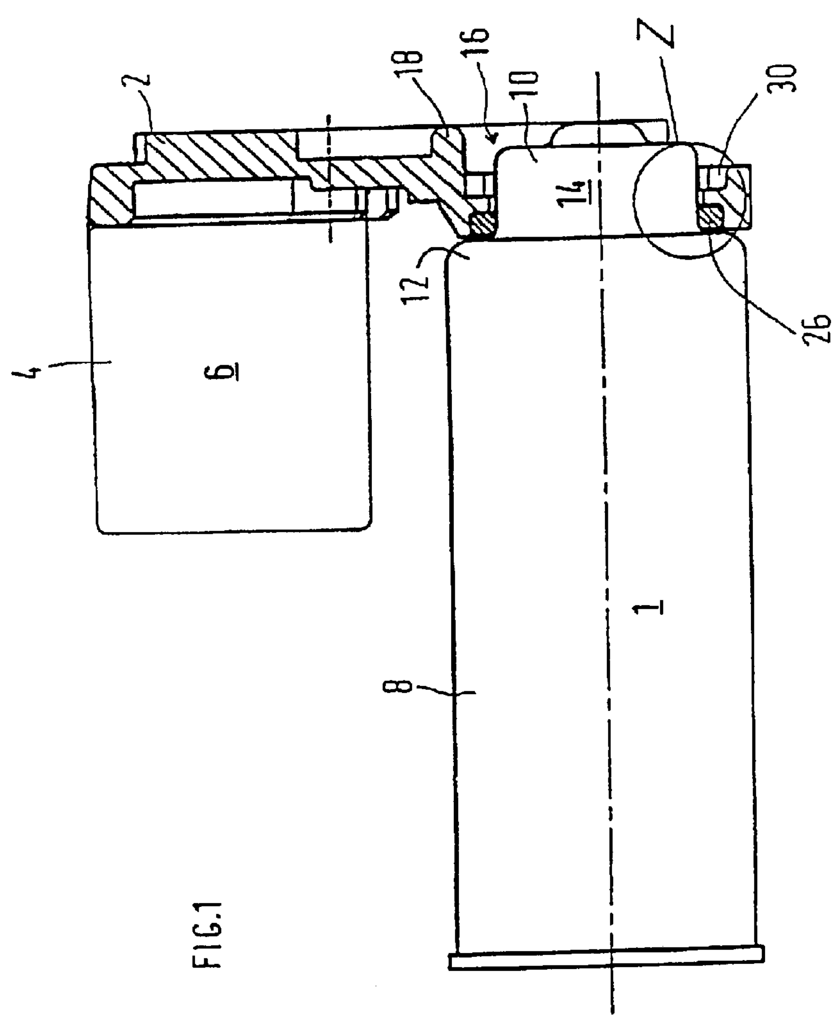
FIG. 1 is a side view of an electric motor and control electronics as components of a clutch actuator of a motor vehicle that are interconnected by means of a mounting plate shown in a sectional drawing along the line I—I in FIG. 2.

In terms of the components of a clutch actuator for engaging and disengaging a motor vehicle clutch, FIG. 1 only shows, for dimensional reasons, an elongated electric motor 1 and a housing 4 for control electronics attached to said electric motor by means of a flat mounting plate 2, which said control electronics control the electric motor 1. The outer cover of the electric motor 1 is composed of a cylindrical stator housing 8 made of metal, which said stator housing has a shoulder 12 on its end 10 opposite from the mounting plate 2, by way of which said shoulder a neck-shaped attachment segment 14 having a reduced diameter is formed that is designed in the shape of a cylinder, for example.

Figure 2:
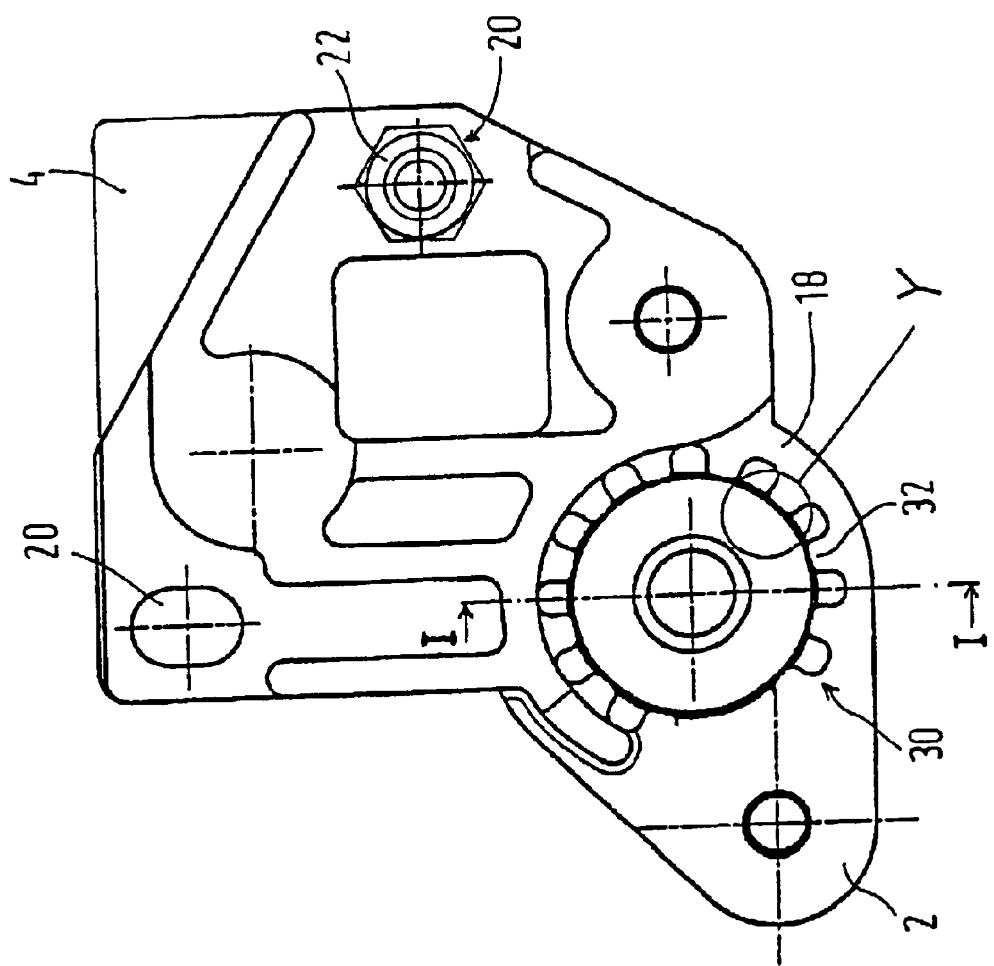
FIG. 2 is a front view of a mounting plate according to FIG. 1.

The neck-shaped attachment segment 14 of the stator housing 8 extends into an, e.g., continuous opening 16 of a collar 18 formed on one end of the mounting plate 2. The mounting plate 2 is composed of electrically conductive material, e.g., aluminum die casting. As shown in FIG. 2, the mounting plate 2 is provided with oblong holes 20 on its other end so that fastening screws 22 screwed into the housing 4 of the control electronics 6 can be guided through. The control electronics 6 and the electric motor 1 are therefore located in space-saving fashion close to each other and parallel with each other on the same side of the mounting plate 2 and essentially extend at a right angle away from said mounting plate.

Figure 3:
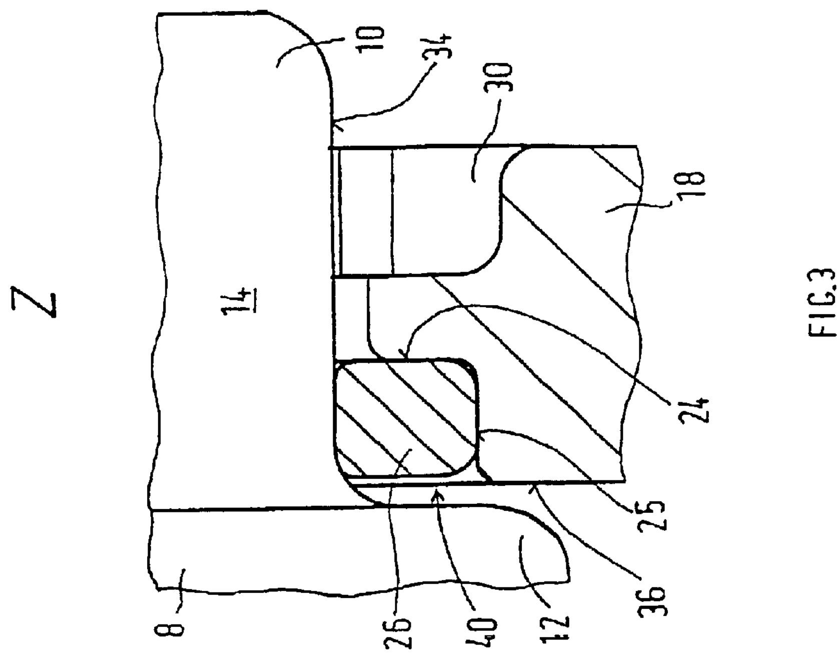
FIG. 3 is an enlarged section Z from FIG. 1.

As shown via the enlarged section Z according to FIG. 3, the collar 18 has a shoulder 24 on its radially inner circumferential surface 25 that faces away from the exposed end 10 of the stator housing 8, in which said shoulder a plastic ring 26 is pressed, the inner diameter of which is somewhat smaller than the outer diameter of the attachment segment 14 located in the area of the shoulder 12 of the stator housing 8. As shown in FIG. 2, a ring 30 is also formed—preferably integral with the collar 18—on the radially inner circumferential surface 25 of said collar, with said ring is outfitted with peripherally-separated blades 32 located around a majority of the circumference of the collar 18 and extending radially inwardly, each of which said blades is outfitted with a thin pinching rib 33 on its exposed end that is best illustrated via the enlarged section Y according to FIG. 4. The plastic ring 26 and the ring 30 are then located close to each other in a tandem arrangement or side by side in the opening 16 of the collar 18 (FIG. 3).

Figure 4:
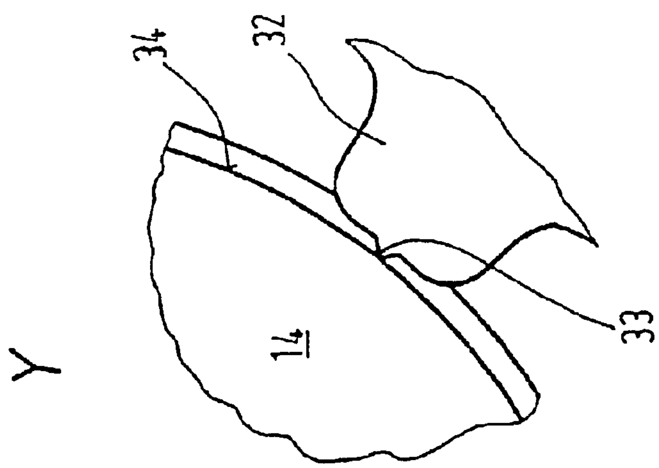
FIG. 4 is an enlarged section Y from FIG. 2.

In terms of assembly, the neck-shaped attachment segment 14 of the stator housing is pressed into the opening 16 of the collar 18, which causes the plastic ring 26 to be compressed in the radial direction. The stator housing 8 is then held on the mounting plate in vibration-resistant fashion by the plastic ring 26 by means of a non-positive connection. Moreover, by inserting the attachment segment 14 in the opening 16, the pinching ribs 33 of the ring 30 come to bear against an outer circumferential surface 34 of the attachment segment 14 in line contact—which is best illustrated in FIG. 4—and, as a result of this, they are compressed by a small amount in the radial direction. In this fashion, the act of assembly not only results in a mechanical connection being established by means of the plastic ring 26, it simultaneously establishes an electrically conductive contact between the stator housing 8 and the mounting plate 2. In terms of function, i.e., with regard for the mechanical and electrical connection between the stator housing 8 and the mounting plate 2, the plastic ring 26 and the ring 30 are therefore connected in parallel.

In the assembled state, the end face 36 of the collar 18 facing the shoulder 12 of the stator housing 8 does not contact the stator housing 8, so that an annular gap 40 formed between the radially inner circumferential surface 25 of the opening of the mounting plate 2 and the radially outward circumferential surface 34 of the attachment segment 14 of the stator housing 8 is bridged in electrically conductive fashion exclusively by the ring 30, while the plastic ring 26 performs an insulating function. An electrically conductive connection between the stator housing 8 and the housing 4 of the control electronics is therefore established by the ring 30 on the mounting plate 2, by way of which the potential of the stator housing 8 that occurs when the electric motor 1 is operated and the other potential of the housing 4 for the control electronics 6 can be equalized. By means of this measure, the stator housing 8 is interconnected with the housing 4 for the control electronics 6 in electromagnetically compatible fashion.

According to an alternative exemplary embodiment, the attachment segment 14 of the stator housing 8 can be designed—instead of cylindrical in shape—in such a fashion that it tapers toward the exposed end 10 of the stator housing 8. Moreover, the attachment segment 14 and the associated opening 16 of the collar 18 can have a cross section that, instead of being cylindrical, is rectangular, polygonal or elliptical, or has any other type of cross section. The contours of the plastic ring 26 and the ring 30 are then adapted to the respective shape of the cross section. It is also feasible that a plurality of such plastic rings 26 or rings 30 are located side by side.

The invention is not limited to a connection between an electric motor 1 and control electronics 6 of a clutch actuator. Rather, it can also be used to mechanically and electrically interconnect other components that have different electrical potentials.

What is claimed is:

1. A device for connecting vibrating components that have different electrical potentials, in particular for connecting a stator housing (8) for an electric motor (1) with a housing (4) for control electronics (6) insides clutch actuator of a motor vehicle, containing electrical contact means (30) for establishing an electrically conductive connection between the components and the means (26) of connecting them mechanically, wherein means for establishing the mechanical connection have at least one plastic ring (26) held in an opening (16) of a first component (2, 4, 6), and a neck-shaped attachment segment (14) formed in a second component (1, 8), whereby, by pushing the neck-shaped attachment segment (14) of the second component (1, 8) into the opening (16) of the first component (2, 4, 6), the plastic ring (26) can be compressed in the radial direction, producing a non-positive connection between the two components, and, simultaneously, the electrical contact means (30) can be engaged with each other.

2. The device according to claim 1, wherein the first component contains a mounting plate (2) composed of an electrically conductive material and a housing (4) for the control electronics (6), which said housing is attached to one end of said mounting plate and is electrically conductive as well, and the opening (16) is formed in a collar (18) at the other end of the mounting plate (2).

3. The device according to claim 2, wherein a shoulder (24) is formed on a radially inner circumferential surface (25) of the collar (18), into which said shoulder the plastic ring (26) engages.

4. The device according to claim 3, wherein the second component of the electric motor (1) of the clutch actuator is the stator housing (8) composed of an electrically conductive material.

5. The device according to claim 4, wherein the housing (4) that contains the control electronics (6), and the stator housing (8) are located close together and parallel to each other on the same side of the mounting plate (2).

6. The device according to claim 5, wherein the stator housing (8) has a shoulder (12) on its end opposite from the mounting plate (2), by way of which a neck-shaped attachment segment (14) that has a reduced diameter and is preferably cylindrical in shape is formed.

7. The device according to claim 6, wherein the plastic ring (26), in the installed state, is pressed into an annular gap (40) between a radially outer circumferential surface (34) of the attachment segment (14) and the radially inner circumferential surface (25) of the opening (16).

8. The device according to claim 7, wherein the electrical contact means contain a ring (30) formed on the radially inner circumferential surface (25) of the opening (16) of the mounting plate (2), which said ring has peripherally-separated blades (32) located around at least part of the circumference of the opening (16) and extending radially inwardly, each of which said blades is outfitted with a thin pinching rib (33) on its exposed end, which said pinching rib can be brought to bear against the outer circumferential surface (34) of the attachment segment (14) while the attachment segment (14) is inserted in the opening (14) and, as a result, it can be compressed by a small amount in the radial direction.

9. The device according to claim 8, wherein the plastic ring (26) and the ring (30) are located in the opening (16) in a tandem arrangement in close axial proximity to each other.

10. The device according to claim 9, wherein the electrical contact between the stator housing (8) and the mounting plate (2) is established exclusively by the ring (30).

* * * * *